(12) United States Patent
Gili et al.

(10) Patent No.: US 6,789,933 B2
(45) Date of Patent: Sep. 14, 2004

(54) HANDHELD OR IMMERSION BLENDER WITH COUPLING DEVICE

(75) Inventors: Sergi Gili, El Prat del Llobregat (ES); Antonio Rebordosa, Sant Fruitos de Bages (ES); Mariano Penaranda, Barcelona (ES); Robert Rafols, Sant Fost de Campcentelles (ES)

(73) Assignee: Braun GmbH (DE)

( * ) Notice: Subject to any disclaimer, the term of this patent is extended or adjusted under 35 U.S.C. 154(b) by 75 days.

(21) Appl. No.: 10/100,994

(22) Filed: Mar. 19, 2002

(65) Prior Publication Data

US 2002/0136086 A1 Sep. 26, 2002

(30) Foreign Application Priority Data

Mar. 23, 2001 (DE) .......................... 101 14 373

(51) Int. Cl.[7] .............................. B01F 15/00; B01F 7/00; F16C 15/00
(52) U.S. Cl. ........................ 366/129; 366/331; 464/182; 464/901
(58) Field of Search ................................ 366/129, 331, 366/279; 403/329, 327, 326, 353, 322.2, 357, 325, 349, 350, 351, 352, 364, 366; 464/901, 182

(56) References Cited

U.S. PATENT DOCUMENTS

| | | | | |
|---|---|---|---|---|
| 1,001,376 A | * | 8/1911 | Elsas .......................... | 403/349 |
| 1,033,187 A | * | 7/1912 | Metzger ...................... | 403/329 |
| 1,082,397 A | * | 12/1913 | Blass .......................... | 439/306 |
| 1,260,690 A | * | 3/1918 | Liady .......................... | 403/364 |
| 2,092,060 A | * | 9/1937 | Gairing ....................... | 403/348 |
| 2,367,458 A | * | 1/1945 | Coplen ........................ | 403/348 |
| 2,630,303 A | * | 3/1953 | Krucker ....................... | 366/331 |
| 4,082,327 A | * | 4/1978 | Stinge et al. | |
| 5,366,286 A | * | 11/1994 | Ruttimann ................... | 366/129 |
| 6,416,415 B1 | * | 7/2002 | Yu ............................... | 403/364 |

FOREIGN PATENT DOCUMENTS

| | | |
|---|---|---|
| DE | 6605769 | 12/1962 |
| DE | 4301209 C2 | 6/1995 |
| DE | 200 06 028 U1 | 8/2000 |
| EP | 0 692 215 A1 | 1/1996 |
| FR | 1467108 | 1/1967 |

* cited by examiner

Primary Examiner—Tony G. Soohoo
(74) Attorney, Agent, or Firm—Fish & Richardson P.C.

(57) ABSTRACT

The invention is directed to a handheld or immersion blender including a coupling device (1) for separating the shank provided with a processing tool from the electrically powered drive part, with an upper coupling part (2) arranged on the drive part having locking elements and a lower coupling part (3) arranged on the tool shank having detent elements, which enable the coupling device (1) to be interlocked axially. In this arrangement the locking elements are formed by spring-loaded holding lugs (11) projecting radially outwardly, and the detent elements are formed by recesses (16) on the inner circumference of the lower coupling part (3), with the upper coupling part (2) being twistable relative to the lower coupling part (3), whereby a releasable coupling is obtained. An improved handheld or immersion blender is thereby made available. The processes of coupling and decoupling an attachment to and from a drive part are made possible readily and without any major force using a simple click-in/turn-out motion. With the coupling of the handheld or immersion blender of the invention requiring only a small number of components and with no need to fit any additional actuating elements, blender operation is simple and manufacture straightforward.

25 Claims, 5 Drawing Sheets

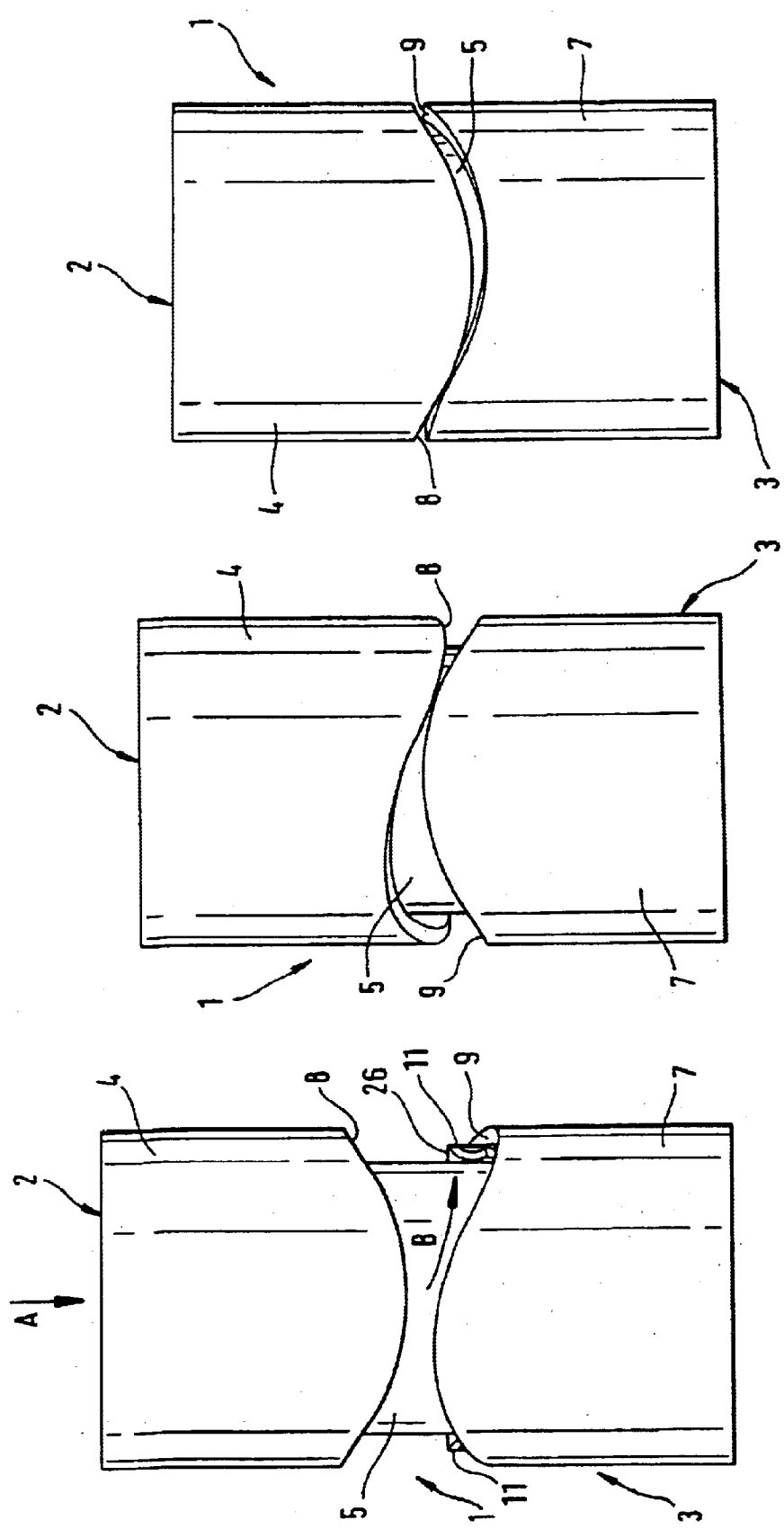

HANDHELD OR IMMERSION BLENDER WITH COUPLING DEVICE

This invention relates to a handheld or immersion blender with a coupling device.

This application claims the benefit of a foreign priority application filed in Germany, serial number 10114373.3, filed Mar. 23, 2001.

A plurality of handheld or immersion blenders with coupling devices are known in the art. Suitable coupling devices are used as a rule to fixedly position a drive shaft, which is connected to a motor part, relative to a tool shaft, which is fitted to an attachment, in the shaft longitudinal direction, thereby enabling a torque to be transmitted from the drive shaft to the tool shaft and hence to a tool of the attachment. In this arrangement the coupling device has one coupling half fixedly connected with the motor part, while the other coupling half is fixedly connected with the attachment. One known type of connection in this context is a threaded connection of the two components needing to be connected.

A further coupling device is disclosed in FR 1467108, for example. In a handheld kitchen appliance according to this disclosure, a mixer in the form of an attachment is plugged onto the elongated housing of a motor part. On this appliance the tool shaft is held in axially fixed position relative to the drive shaft by means of the stationary housing part of the attachment. Said housing part is connected to the stationary housing of the drive part by means of a snap lock. The snap lock is formed by an arrangement of holding elements on the material, which under spring pressure act inwardly in the direction of a circular receiving opening. The cylindrical coupling section of the attachment has a circumferential groove within which the holding elements engage. The tool shaft itself is inserted by its geared coupling end into a registering coupling gearing of the drive shaft. The coupling locator is formed by an internally geared sleeve. The attachment is released by pressing an ejection device which is constructed on the housing of the drive part in the form of a push-button and recovers the holding elements from the groove, thereby releasing the attachment. This also results in the geared shaft end of the tool shaft being pushed out of the coupling device.

Another coupling device for a kitchen appliance is described in EP-0 692 215 A1. This specification discloses a handheld blender in which a tool shank containing the tool shaft is detachably connected to the motor part of the handheld blender. For this purpose provision is made on the motor part, perpendicular to the drive shaft, for an approximately U-shaped expansion clamp that engages in a mounting groove of the tool shank. The free ends of the expansion clamp are in engagement with expansion surfaces. To release the connection between the motor part and the tool shank the expansion clamp is displaced by means of a push-button. The free ends then slide along the expansion surfaces, causing the legs of the expansion clamp to be pressed apart so that they leave the mounting groove. The connection between the motor part and the tool shank is thus released, enabling the parts to be separated from each other. The arrangement of the expansion surfaces required for spreading the expansion clamp apart and of the push-buttons required for actuating the expansion clamps represents a not insubstantial effort in terms of parts and assembly.

Finally, a further coupling device for a kitchen machine is disclosed in German Utility Model DE 200 06 028 U 1. In this disclosure the connection between the motor housing and a shank part is effected by means of a holding element which is made of an elastic material, preferably plastic, and essentially forms a frame with one longer and one shorter axis. It is thus possible to establish a clamping connection between the housing parts, which is releasable by actuating projecting push-button elements. With this connection the stationary housing parts are held in axially fixed position in the shaft longitudinal direction. The shaft torque of the drive shaft is transmitted to the tool shaft via a geared coupling.

A disadvantage of the described coupling devices for kitchen machines is, on the one hand, their elaborate operation, so that with threaded connections, for example, there is always a risk of the threaded components becoming skewed, and, on the other hand, their high number of moving parts, as is the case with coupling connections having separate holding elements, helical springs and actuating push-buttons, for example.

It is an object of the present invention to provide an improved handheld or immersion blender comprising a coupling device. Coupling and decoupling an attachment to and from a drive part should be easy and require no major force. Such a coupling device should also afford simple and low cost manufacture.

This object is accomplished by a handheld or immersion blender incorporating the features of patent claim 1. Advantageous embodiments of the invention will be described in the subclaims.

An improved handheld or immersion blender is made available by the embodiment of the invention with the features of patent claim 1. Coupling and decoupling an attachment to and from a drive part can be effected readily and without any major force using a simple click-in/turn-out motion. In axial direction the upper coupling part is axially locked with a simple snap action of the holding lugs in recesses on the inner circumference of the lower coupling part. With the coupling of the handheld or immersion blender of the invention requiring only a small number of components and with no need to fit any additional actuating elements, its manufacture is straightforward and economical. An essentially smooth and washable housing construction is also possible as the result.

It is also conceivable, of course, to fit the holding lugs to the lower coupling part and to provide the recesses on the upper coupling part, without departing from the spirit of the invention, i.e., the result is an equivalent solution.

An advantageous embodiment of the invention is provided by the features of patent claim 2. In this arrangement the ramp is constructed as a steadily ascending bead. Hence when the upper coupling part is inserted in the lower coupling part, for example, the holding lugs are able to slide along the ramp, with the holding lugs being previously pressed resiliently inwardly in radial direction in order to enable insertion in the first place.

An advantageous further development of patent claim 2 is provided by the features of patent claim 3. This shape design guarantees, in surprisingly simple manner, that the holding lugs lock into place reliably, regardless of the direction from which they approach the lug receiving socket.

An advantageous further development of claim 2 is also provided by the features of patent claim 4. Hence when the two coupling parts are twisted relative to each other it is possible to move them reliably in axial direction, meaning it is possible to separate the two parts.

The features of patent claim 5 enable a reliable locking action to be achieved on account of the hook engagement in the undercut of the holding edge in the lug receiving socket.

Yet another advantageous further development of patent claim 2 is provided by the features of patent claim 6. Simple decoupling is thus possible, for example, when the holding lugs lie at the ends of the U-legs.

Finally, still another development of patent claim 2 is provided by the features of patent claim 7. Provision can thereby be made for the coupling device to be axially locked as soon as the holding lugs are positioned underneath the vertex of the ramp.

A further advantageous embodiment of the present invention is provided by the features of patent claim 8. The sliding movement of the holding lugs along the ramp is thereby facilitated.

Of particular advantage is an embodiment with the features of patent claim 9. It enables the holding lug to be locked in the holding edge of the lug receiving socket.

Yet another advantageous embodiment of the present invention is provided by the features of patent claim 10. In this embodiment the wave shape and the ramp, which is defined by the lug receiving socket, are coordinated to enable the coupling connection to be decoupled by a simple "turn-out" action. Furthermore, a suitable wave shape defines the position of the upper coupling part relative to the lower coupling part in the locked state, i.e., a fail-safe function is established.

A further advantageous embodiment is provided by the features of patent claim 11. It facilitates the processes of locating the upper coupling part centrally relative to the lower coupling part and relative twisting.

Another advantageous further development of the embodiment of patent claim 11 is provided by the features of patent claim 12. It is thus possible to manufacture the part as a simple and low cost injection molding, which can be finish-machined as and when required and has resilient holding lugs.

A further advantageous embodiment of the present invention is provided by the features of patent claim 13. A low-cost, washable, hygienic and impact-resistant construction is thus possible. It will be understood, of course, that other suitable materials may also be contemplated.

Further configurations and advantages of the present invention will be explained in the following description of the embodiments, reference being had to the accompanying drawings. In the drawings, FIG. 1 is a perspective view of an embodiment of a coupling device of the invention for a kitchen appliance;

FIGS. 6, 7, 8 are three schematic views of the coupling device of FIG. 1 showing various steps during the coupling process;

Figure 1:
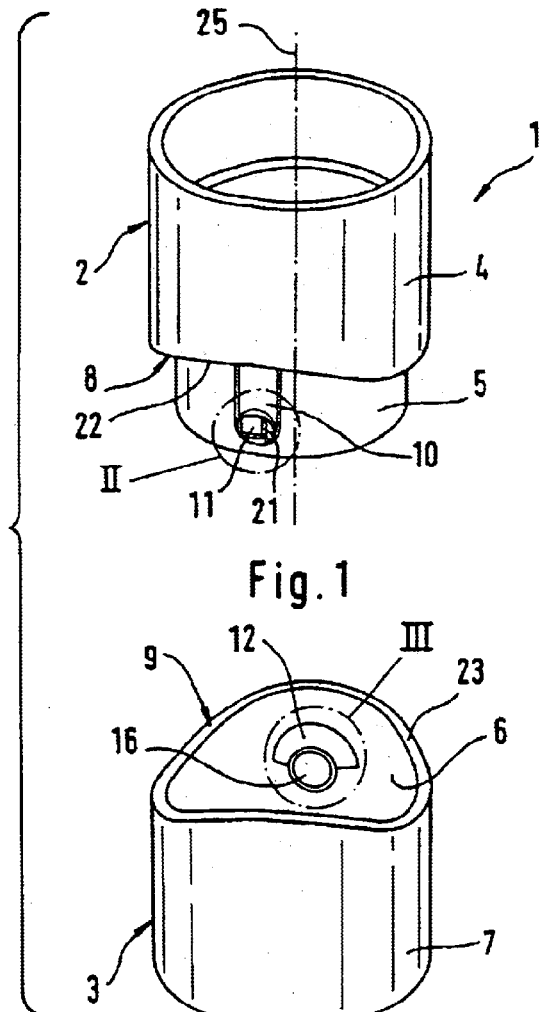
Figure 13:
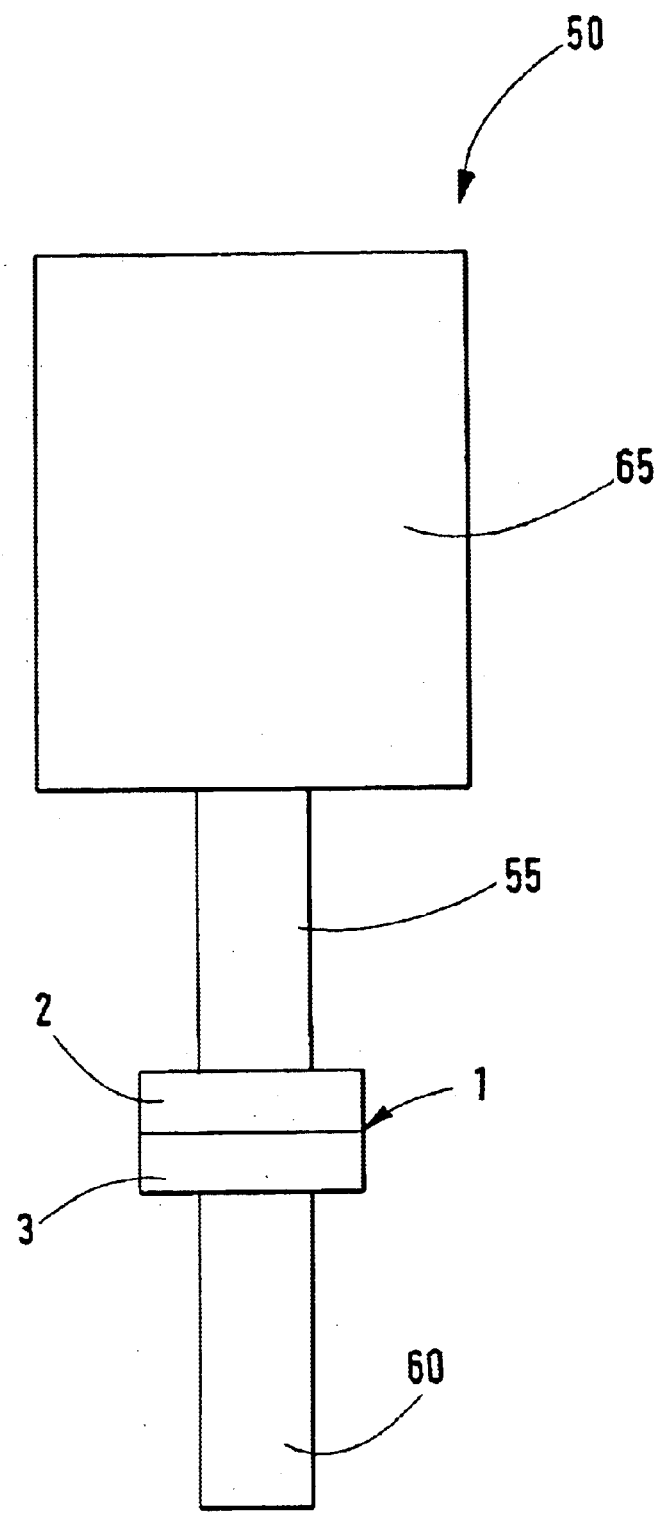
FIG. 13 is a schematic view of a kitchen appliance having a coupling device.

FIG. 1 shows a perspective representation of a coupling device 1. Referring to FIGS. 1 and 13, an essentially hollow cylindrical upper coupling part 2 which has its upper continuation in the housing 65 of the drive part or electric motor (not shown) of an immersion blender 50. Also shown is the lower coupling part 3 of likewise essentially hollow cylindrical configuration, which has at its continuation in the respective attachment of the immersion blender 50. In the present embodiment both the upper coupling part 2 and the lower coupling part 3 are made of a thermoplastic material. The drive shaft 55 extends concentrically to the upper coupling part 2. The tool shaft 60 extends concentrically to the lower coupling part, which likewise is not illustrated.

The upper coupling part 2 has a smooth case 4 which has a lower shoulder 8 provided with a wave-shaped sliding surface 22. The sliding surface 22 extends in a direction substantially transverse to the longitudinal axis 25 of the upper coupling part 2. Adjoining the shoulder 8 is a smooth cylindrical guide sleeve 5 that has a smaller diameter than the case 4. The shoulder 8 takes a wavy, curved course. The likewise cylindrical guide sleeve 5 includes spring elements 10, each of which is off-set by 180° and carries one holding lug 11. In the present embodiment the holding lug 11 is made likewise of a thermoplastic material and projects in radial direction beyond the circumference of the guide sleeve 5.

Figure 2:
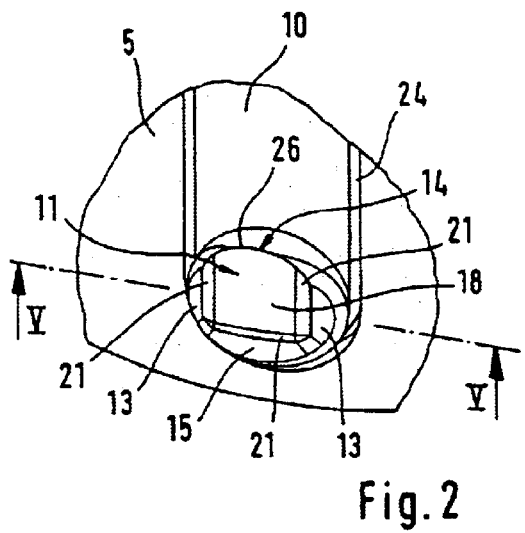
FIG. 2 is a view of a detail II of FIG. 1.
Figure 5:
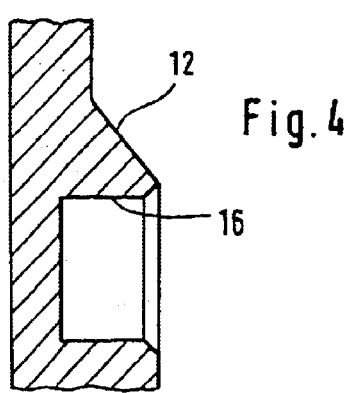
FIG. 5 is a partial sectional view taken along the line V—V of FIG. 2.
Figure 9:
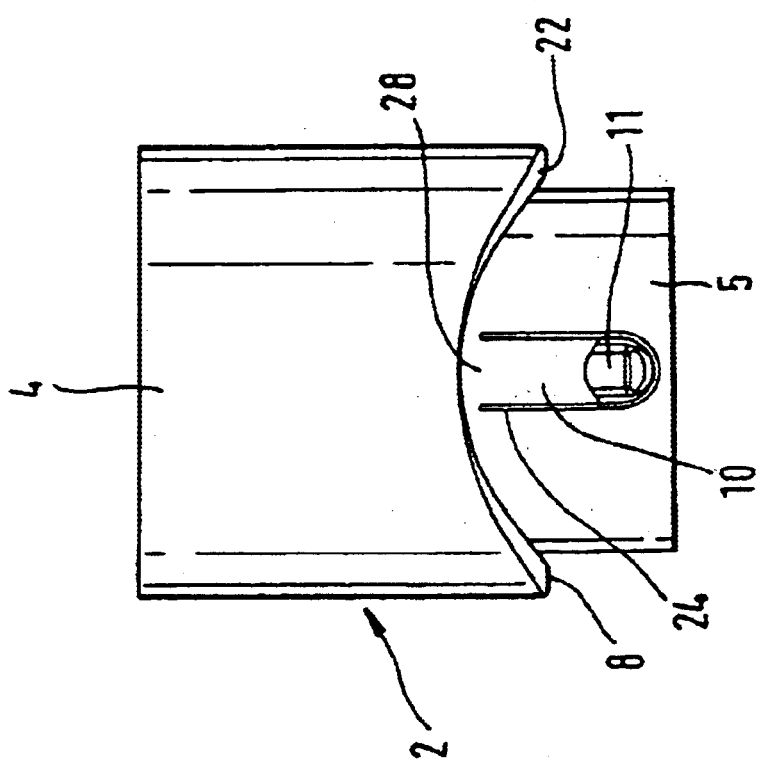

Detail II, which represents the spring element 10 and the holding lug 11, is shown in FIG. 2 on an enlarged scale. The edges 21 between the front side 18 of the holding lug 11 and the lug flanks 13 and the bottom side 15 of the holding lug 11 are of a radiused or beveled configuration. The edge 26 between the top side of the holding lug 11 and the front side 18 is constructed as a holding hook 14, i.e., it projects like a barb above the top side of the holding lug 11. Furthermore, FIG. 5 shows a section along the line V—V, illustrating once again the basic construction of the guide sleeve 5 with the spring element 10, with the spring element being separated from the guide sleeve 5 by lateral slits 24 so that it is resiliently connected to it only in the upper portion 28 (FIG. 9).

Figure 11:
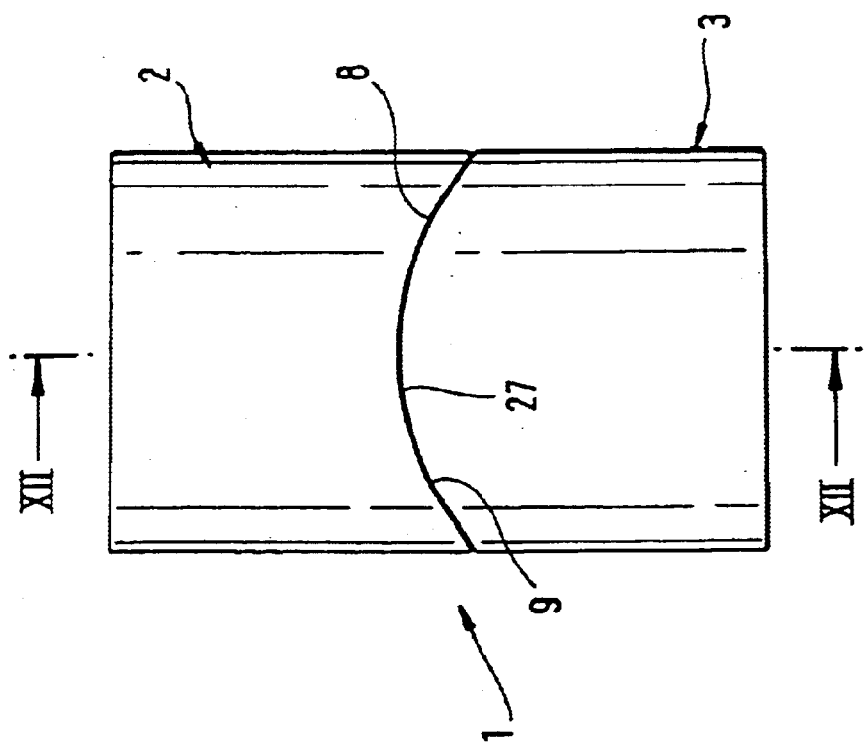
FIG. 11 is a schematic view of the coupling device of FIG. 1.

FIG. 1 also shows a schematic perspective representation of the lower coupling part 3. In this representation the lower coupling part 3 is essentially constructed as a hollow cylinder having at its upper end a sliding surface 23 constructed as a sliding support 9. The sliding support 9 is of a wave-shaped configuration mating with the shoulder 8 of the upper coupling part 2, i.e., in the inserted state the two sliding surfaces 22, 23 are in relative engagement and form a small slot 27 (FIG. 11). The sliding surfaces 22, 23 extend circumferentially around the parts 2, 3.

Figure 3:
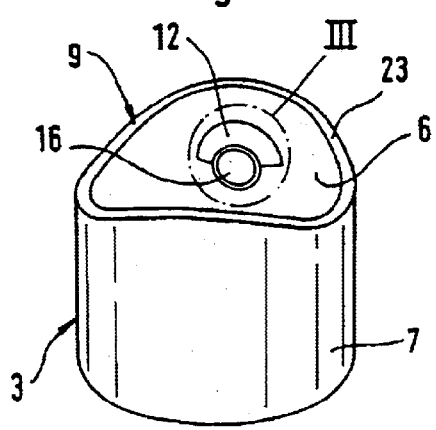
FIG. 3 is a view of a detail III of FIG. 1.

Crescent-shaped ramps 12, offset through 180°, are arranged on the smooth inner wall 6 of the lower coupling part 3. In FIG. 3 the ramp 12 is shown on an enlarged scale as detail III of FIG. 1. Underneath the ramp is a lug receiving socket 16 constructed as a circular depression or groove. The inner diameter of the lower coupling part 3 is of a size just sufficient to receive the guide sleeve 5 of the upper coupling part 2.

Further, the outer wall 7 of the lower coupling part 3 is constructed so that in the coupled state it smoothly blends with the case 4 of the upper coupling part 2.

Figure 4:
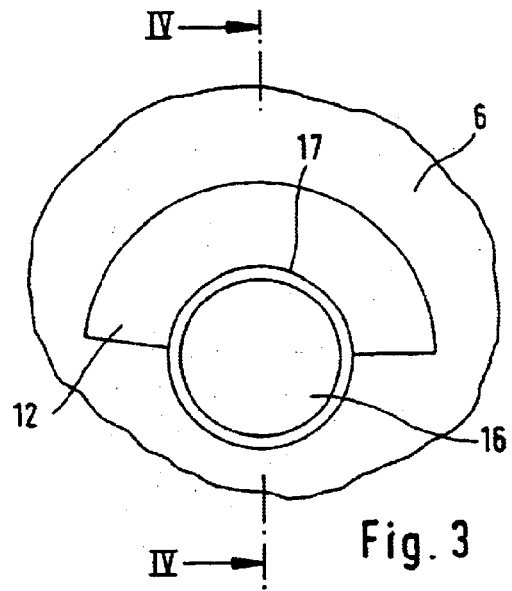
FIG. 4 is a partial sectional view taken along the line IV—IV of FIG. 3.

As mentioned in the foregoing, FIG. 3 shows detail III of FIG. 1. The crescent-shaped ramp 12 is arranged like a recumbent U, i.e., the two leg sides point down and the curve points up in the direction of the upper coupling part 2. The width of the ramp 12 remains essentially constant. The lower edge of the ramp 12, i.e., the inner side of the U, which forms the holding edge 17, is constructed as a smooth projection or undercut suitable for engagement by the holding hook 14 of the holding lug 11. As becomes apparent from the representation in FIG. 3, the two legs of the U terminate approximately in a plane perpendicular to the cylinder axis of the lower coupling part. The basic construction becomes apparent once again in FIG. 4 in the section along the line IV—IV. This representation shows in particular the ramp 12 and the lug receiving socket 16.

FIGS. 6, 7 and 8 show three steps of the coupling operation which will be explained in the following.

FIG. 6 shows the coupling device 1 comprised of the upper coupling part 2 and the lower coupling part 3, with the upper coupling part 2 being seated in the direction of arrow A onto the lower coupling part 2. The "wave crests" of the shoulder 8 of the upper coupling part 2 and the sliding support 9 of the lower coupling part 3 are in facing relationship with respect to each other. The guide sleeve 5, which has a smaller diameter than the outer wall 4 of the upper coupling part 2, is partly received in the lower coupling part 3. Furthermore, the holding lugs 11, which are offset through 180°, project from the spring elements 10, not visible, of the upper coupling part 2 to the right and left of the guide sleeve 5.

With a slight pressure applied in the direction of arrow A, the upper coupling part 2 is now twisted in the direction of arrow B while the lower coupling part 3 is held tight. The shoulder 8 of the upper coupling part 2 slides in the process along the sliding support 9 of the lower coupling part 3, i.e., the "wave crest" of the shoulder 8 slides into the "wave trough" of the sliding support 9.

FIG. 7 shows a further step of the coupling operation in which the upper coupling part 2 and the lower coupling part 3 are already partly twisted relative to each other, i.e., the "wave crest" of the shoulder 8 of the upper coupling part 2 is already approaching the "wave trough" of the sliding support 9 of the lower coupling part 3. As already shown in FIG. 6, the upper coupling part 2 thus moves down in the direction of arrow A. The guide sleeve 5 travels deeper and deeper into the lower coupling part 3.

FIG. 8 shows the coupling device 1 shortly before attaining its fully coupled state. In the coupled state the shoulder 8 of the upper coupling part 2 and the sliding support 9 of the lower coupling part 3 are in fully engaging relationship with respect to each other, i.e., the wavy shapes of the shoulder 8 and the sliding support 9 correspond with each other. This and the guide sleeve 5 operate to locate the two coupling halves centrally relative to each other. The outer wall 4 of the upper coupling part 2 and the outer wall 7 of the lower coupling part 3 blend with their respective surfaces. The guide sleeve 5 disappears completely within the lower coupling part 2.

In this arrangement the holding lugs 11 are of a resilient configuration, i.e., during the coupling operation they initially disappear fully in the contour of the guide sleeve 5 when the upper coupling part 2 engages in the lower coupling part 3, as shown in FIG. 6. While the upper coupling part 2 is being twisted relative to the lower coupling part 3 the depressed holding lugs 11 slide along the inner wall 6 of the lower coupling part until they reach a leg of the crescent-shaped ramp 12. At the ramp 12 the spring-loaded holding lugs 11 slide up until they finally snap into the lug receiving sockets 16. As this occurs, the holding lug 11 engages with its holding hook 14 in the undercut of the holding edge 17 of the lug receiving socket 16. This position is reached when the shoulder 8 of the upper coupling part 2 rests completely on the sliding support 9 of the lower coupling part 3.

The coupling device 1 is now fully coupled, i.e., the upper coupling part 2 with the lower coupling part 3. The attachment is thus axially locked to the drive part.

The coupling operation can also be effected by positioning the upper coupling part 2 and the lower coupling part 3 in relation to each other so that the "wave crests" of the shoulder 8 and the "wave troughs" of the sliding support 9 already correspond with each other. In this case the upper coupling part 2 and the lower coupling part 3 need only be moved toward each other in axial direction. After the guide sleeve 5 enters the lower coupling part 3 the holding lugs 11 are pressed inwardly by the inner wall 6 of the lower coupling part 3. When the shoulder 8 is seated down on the sliding surface 9 the holding lugs 11 snap into the lug receiving sockets 16 where the holding hooks 14 of the holding lugs 11 latch in the holding edges 17. This locks the coupling device 1 axially.

To decouple, the coupling operation described with reference to FIGS. 6 to 8 is performed in reverse direction. This involves twisting the upper coupling part 2 relative to the lower coupling part 3. The holding lug 11 slides on its bottom side 15 or on one of its lug flanks 13 up the ramp 12 until it reaches a position where the holding hooks 14 of the holding lugs 11 are no longer engaged with the holding edges 17 of the lug receiving sockets 16. The holding lug 11 thus slides over the radiused or beveled corners between the front side 18 of the holding lug 11 and the lug flanks 13 out of the groove-shaped depression of the lug receiving socket 16 and is pressed in against the spring pressure of the spring elements 10 provided on the guide sleeve 5 of the upper coupling part 2. The upper coupling part 2 is then simply twisted out via the wave-shaped shoulder 8. The result is an arrangement referred to as "click-in/turn-out".

Figure 10:
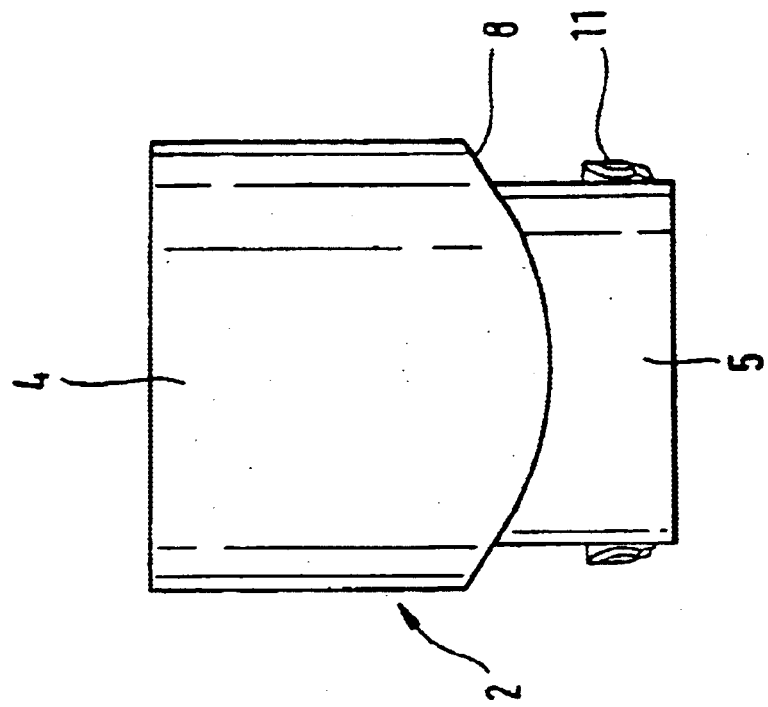
FIGS. 9, 10 are two schematic views of the upper coupling half of the embodiment of FIG. 1, each turned through 90°.

FIGS. 9 to 10 show two schematic views of the upper coupling part 2, each turned through 90°. They show the case 4 and the guide sleeve 5. Also shown in FIG. 9 is the spring element 10, which extends on the guide sleeve 5 parallel to the longitudinal axis of the coupling device, and the holding lug 11 projecting at right angles thereto. The smaller diameter of the guide sleeve 5 relative to the outer wall 4 of the upper coupling part 2 becomes also clearly apparent. The shoulder 8 between the case 4 and the guide sleeve 5 is formed by the wave-shaped sliding support.

FIG. 11 shows a schematic view of the coupling device 1 in the coupled state. In this state the shoulder 8 of the upper coupling part 2 rests completely on the sliding support 9 of the lower coupling part 3.

Figure 12:
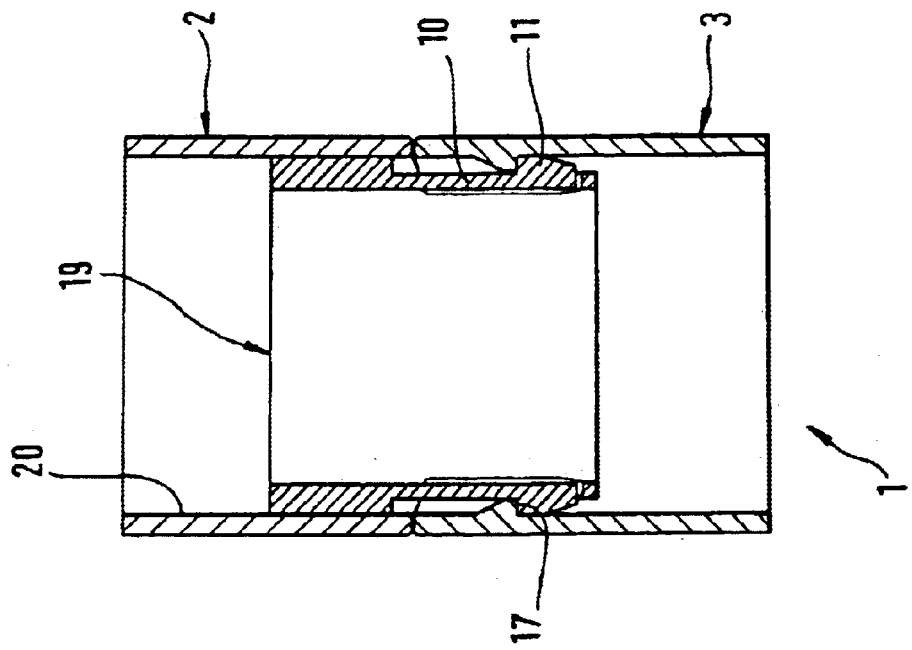
FIG. 12 is a schematic sectional view of the coupling device taken along the line XII—XII of FIG. 11.

FIG. 12 shows a schematic sectional representation of the coupling device 1 of FIG. 11 along the section line XII—XII. An essentially cylindrical sleeve 19 is provided in the upper coupling part 2. The sleeve 19 rests against the inner wall 20 of the upper coupling part 2. The sleeve 19 has spring elements 10 integrally formed therewith as a one-piece construction. At the lower end of the spring elements 10 is a portion from which the holding lugs 11, offset through 180°, project. In the present embodiment the sleeve 19 is made of an elastic plastic material.

Furthermore, the sectional representation of FIG. 12 shows schematically the lower coupling part 3, which in the area of the lug receiving socket 12 has the holding edge 17 into which the holding hooks 14 of the holding lug 11 engage in the locked state.

What is claimed is:

1. A coupling device for separating a shank of a processing tool from an electrically powered drive part of a hand-held blender, said coupling device comprising:

an upper coupling part which during use is arranged on the drive part, said upper coupling part having a locking element; and a lower coupling part which during use is arranged on the tool shank, said lower coupling part having a detent element which enables the upper and lower parts to be interlocked axially, wherein the locking element is formed by a spring-loaded holding lug projecting radially outwardly, and the detent element is formed by a recess on an inner circumference of the lower coupling part, and the upper coupling part is twistable relative to the lower coupling part whereby a releasable coupling is obtained;

wherein each of the upper coupling and the lower coupling part includes a separating device moving that coupling part axially away from the other coupling part when the upper and lower coupling parts are twisted.

2. The coupling device of claim 1, wherein a first ramp is formed around the recess, and the holding lug slides along the first ramp when the upper coupling part is inserted into the lower coupling part, the lug being pressed resiliently inwardly.

3. The coupling device of claim 2, wherein the ramp has a configuration that is one of two shapes, said two shapes consisting of crescent-shaped and U-shaped.

4. The coupling device of claim 2, wherein the ramp forms an undercut holding edge.

5. The coupling device of claim 2, wherein the lower coupling part has a longitudinal axis and ends of the ramp lie in a plane perpendicular to the longitudinal axis of the lower coupling part.

6. The coupling device of claim 2, wherein the ramp has a vertex that points in a direction of the upper coupling part when the upper and lower coupling parts are connected together.

7. The coupling device of claim 1, wherein a front side of the holding lug has one of radiused and beveled edges.

8. The coupling device of claim 1, wherein the holding lug has a holding hook provided between the front side and a top side of the holding lug.

9. The coupling device of claim 1, wherein a shoulder formed on the upper coupling part and a sliding support formed on the lower coupling part each have wave-shaped mating surfaces which in an assembled state are in relative engagement and opposite each other and the separating device.

10. The coupling device of claim 1, wherein the upper coupling pail has a cylindrical guide sleeve adapted to be received in the lower coupling part.

11. The coupling device of claim 10, wherein the guide sleeve is made of a plastic material having slits for receiving a spring element at a free end from which the holding lug projects.

12. The coupling device of claim 1, wherein the upper coupling part and the lower coupling part are fabricated from a thermoplastic material.

13. A handheld blender, comprising:
 a blender housing having a grip region adapted to be grasped by a user's hand;
 an electrically powered drive unit positioned within the housing;
 a drive part having a first end and a second end, the first end being connected to the drive unit;
 an upper coupling part attached to the second end of the drive part, the upper coupling part having an outer circumferential surface;
 a spring-loaded holding lug projecting radially outwardly from the outer circumferential surface of the upper coupling part;
 a shank having a first end and a second end, the first end having a processing tool attached thereto; and
 a lower coupling part attached to the second end of the shank, the lower coupling part defining a central cavity and having an inner circumferential surface, the inner circumferential surface defining a recess, wherein the holding lug engages within the recess upon inserting the upper coupling part into the central cavity of the lower coupling cart and rotating the upper and lower coupling parts relative to one another, thereby releasably interlocking the upper and lower coupling parts axially.

14. The handheld blender of claim 13, wherein a first ramp is formed around the recess, and the holding lug slides along the first ramp when the upper coupling part is inserted into the lower coupling part, the lug being pressed resiliently inwardly while sliding along the first ramp.

15. The handheld blender of claim 14, wherein the ramp has a configuration that is one of two shapes, said two shapes consisting of crescent-shaped and U-shaped.

16. The handheld blender of claim 13, wherein each of the upper coupling part and the lower coupling part includes a separating device moving that coupling part axially away from the other coupling part when the upper and lower coupling parts are twisted.

17. The handheld blender of claim 14, wherein the ramp forms an undercut holding edge.

18. The handheld blender of claim 14, wherein the lower coupling part has a longitudinal axis and ends of the ramp lie in a plane perpendicular to the longitudinal axis of the lower coupling part.

19. The handheld blender of claim 14, wherein the ramp has a vertex that points in a direction of the upper coupling part when the upper and lower coupling parts are connected together.

20. The handheld blender of claim 13, wherein a front side of the holding lug has one of radiused and beveled edges.

21. The handheld blender of claim 13, wherein the holding lug has a holding hook provided between the front side and a top side of the holding lug.

22. The handheld blender of claim 13, wherein a shoulder formed on the upper coupling part and a sliding support formed on the lower coupling part each have wave-shaped mating surfaces which in an assembled state are in relative engagement and opposite each other and the separating device.

23. The handheld blender of claim 13, wherein the upper coupling part has a cylindrical guide sleeve adapted to be received in the lower coupling part.

24. The handheld blender of claim 23, wherein the guide sleeve is made of a plastic material having slits for receiving a spring element at a free end from which the holding lug projects.

25. The handheld blender of claim 13, wherein the upper coupling part and the lower coupling part are fabricated from a thermoplastic material.

* * * * *